United States Patent [19]

Naraghi

[11] Patent Number: 5,611,991

[45] Date of Patent: *Mar. 18, 1997

[54] CORROSION INHIBITOR CONTAINING PHOSPHATE GROUPS

[75] Inventor: Ali Naraghi, Missouri City, Tex.

[73] Assignee: Champion Technologies, Inc., Houston, Tex.

[*] Notice: The term of this patent shall not extend beyond the expiration date of Pat. No. 5,611,992.

[21] Appl. No.: 599,429

[22] Filed: Jan. 17, 1996

Related U.S. Application Data

[63] Continuation of Ser. No. 248,370, May 24, 1994, abandoned.

[51] Int. Cl.$^6$ .................................................. C23F 11/16
[52] U.S. Cl. .............................. 422/15; 422/7; 422/16; 507/238
[58] Field of Search .............................. 422/7, 15, 16, 422/17; 507/238, 939

[56] References Cited

U.S. PATENT DOCUMENTS

| | | | |
|---|---|---|---|
| 3,510,436 | 5/1970 | Silverstein et al. | 422/15 X |
| 3,617,578 | 11/1971 | Stanford et al. | 210/700 |
| 3,650,981 | 3/1972 | Inouye et al. | 252/389.21 |
| 3,655,569 | 4/1972 | Hellsten et al. | 252/99 |
| 4,339,349 | 7/1982 | Martin et al. | 507/238 |
| 4,388,214 | 6/1983 | Oppenlaender et al. | 252/392 |
| 4,389,371 | 6/1983 | Wilson et al. | 422/15 |
| 4,511,480 | 4/1985 | Outlaw et al. | 507/238 |
| 4,604,226 | 8/1986 | Bartlett | 252/305 |

FOREIGN PATENT DOCUMENTS

| | | |
|---|---|---|
| 1269273 | 5/1968 | Germany . |
| 3206205 | 9/1983 | Germany . |
| 3537696 | 4/1987 | Germany . |
| 8745023 | 2/1987 | Japan . |
| 8901407 | 1/1991 | Netherlands . |

*Primary Examiner*—Christopher Kim
*Attorney, Agent, or Firm*—Gunn & Associates, P.C.

[57] ABSTRACT

The present invention relates to a specific type of phosphate ester that is as effective or more effective than corrosion inhibitors available in the past. In accordance with the invention, these corrosion inhibitors are highly effective alone or when blended with other specific compounds for protection of ferrous metals against attack by a corrosive environment. More particularly, the inhibitors of the present invention are the reaction products of ethoxylated, propoxylated, or butoxylated alcohols or phenols with phosphating agents.

13 Claims, No Drawings

CORROSION INHIBITOR CONTAINING PHOSPHATE GROUPS

This application is a continuation of application Ser. No. 08/248,370, filed May 24, 1994 abandoned.

BACKGROUND OF THE DISCLOSURE

This invention relates to the use of a class of corrosion inhibitors that contain phosphate groups.

Pure metals and their alloys tend to combine with the elements of a corrosive medium to form stable compounds. These compounds are referred to as the corrosion product and the metal surface is said to be corroded.

Corrosion can take several forms. While corrosion is usually confined to the metal surface, it can also occur along grain boundaries because of differences in chemical resistance or local electrolytic action.

In most aqueous systems, the corrosion reaction has anodic and cathodic portions which occur simultaneously at discrete points on the surface of the metal. Electrons flow from an anodic point to a cathodic point to equalize the potential.

In many applications, it may not be economical to use the most corrosion resistant material or a material with satisfactory corrosion resistance may not be known. Other methods of avoiding corrosion, such as the use of glass, ceramic, and organic coatings, may also be prohibitively expensive or incompatible with other process conditions. Similarly, the use of sacrificial anodes to achieve cathodic protection may not achieve satisfactory results or be otherwise practical in many applications. In these cases, an alternative approach is to minimize the corrosion by adding inhibitors to the corrosive medium.

The use of corrosion inhibitors is generally most attractive in closed or recirculating systems in which the annual cost of inhibitor is low. However, inhibitors have also proven to be economical in many once-through systems, such as those encountered in petroleum-processing operations. Inhibitors are effective due to their controlling influence on the cathode or anode area reactions.

Examples of inhibitors used for minimizing corrosion of iron and steel in aqueous solution are the soluble chromates and silicates. Organic sulfide and amine materials are frequently effective in minimizing corrosion of iron and steel in acid solutions. Such inhibitors may also be effective for use with stainless steel and other alloy steel materials.

One disadvantage of many known inhibitors is that these inhibitors are only soluble in the aqueous phase. However, metals are subject to corrosion in oil and gas pipelines, transmission lines, and wells, as well as aqueous systems such as water-disposal systems and processing equipment such as separators, water treatment and dehydration units. This equipment is subject to damaging corrosion which can require expensive replacement or cause catastrophic failure. An extensive amount of time and money has been spent attempting to minimize or eliminate corrosion in a wide variety of materials and environments.

The present invention comprehends a specific type of phosphate ester that is considerably more effective than corrosion inhibitors available in the past. In accordance with the invention, it has now been found that these compounds are highly effective alone or when blended with other specific compounds for protection of ferrous and nonferrous metals against attack by a corrosive environment. An important application of this invention is the prevention of metal corrosion in petroleum and chemical processing equipment, including pipelines, wells, and water treatment units.

SUMMARY OF THE INVENTION

The present invention relates to a corrosion inhibitor comprising an effective amount of an ether phosphate reaction product defined by formula (I): $[R-X-(C_mH_{2m}O)_n]_k-PO(OH)_{(3-k)}$ where R is an alkyl group containing 4 to 18 carbon atoms or an alkylaryl group comprising an aryl group selected from the group consisting of phenol, diphenol, and mixtures thereof, and an alkyl group containing 4 to 18 carbon atoms; X is selected from the group consisting of a carboxyl group (—COO—), oxygen (—O—), secondary amine group (—NH—), and mixtures thereof; m is an integer having a value from about 2 to about 4; n is an integer having a value from about 1 and about 20; and k is from 1 to 2.

DETAILED DESCRIPTION

The present invention relates to a specific type of phosphate ester that is considerably more effective than corrosion inhibitors available in the past. In accordance with the invention, these corrosion inhibitors are highly effective alone or when blended with other specific compounds for protection of ferrous metals against attack by a corrosive environment. These corrosion inhibitors are believed to be chemically absorbed onto the surface of metals, thereby preventing corrosion.

More particularly, the inhibitors of the present invention are the reaction products of ethoxylated, propoxylated, or butoxylated alcohols or phenols with phosphating agents. While the inhibitors are preferably produced by a series of two reactions, their production in any manner is within the scope of the present invention.

The corrosion inhibitors may be characterized as phosphate esters. The particular phosphate esters of the present invention may be characterized further by the formula (I):

$$[R-X-(C_mH_{2m}O)_n]_k-PO(OH)_{(3-k)} \qquad (I)$$

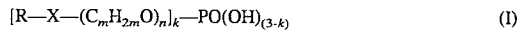

In accordance with the foregoing formula, R is either an alkyl group or an alkylaryl group. The alkyl group may be linear or branched and contain from 4 to 18 carbon atoms. Where R is an alkylaryl group, it has the same alkyl group as just mentioned with the addition of an aryl group such as phenol, diphenol, other hydroxy containing aryl radicals, alkylated hydroxyaryl group, or mixtures thereof.

The component X is selected from the group consisting of a carboxyl group (—COO—), and oxygen atom (—O—), a secondary amine group (—NH—), and mixtures thereof.

The components R and X, taken together, or R—X— are obtained using the reactant R—X—H. Examples of R—X—H include alcohols, carboxylic acids, and amines.

The variable m in $(C_mH_{2m}O)$ is a number from 2 to 4. The starting material or reactant used to obtain an m of 2, 3, or 4 is ethylene oxide, propylene oxide, or butylene oxide, respectively. Of course, higher alkylene oxides may also be used, but they are less efficient than the compositions of the present invention made with these three aklylene oxides.

The variable n in $(C_mH_{2m}O)_n$ is a number from 1 to 20. The value of n is determined by the number of molar equivalents of ethylene oxide, propylene oxide, or butylene oxide allowed to react or polymerize with the reactant R—X—H.

The products of formula (I) can be prepared preferentially in a two step process as shown below.

In Reaction (1), R—X—H is reacted with an alkylene oxide to yield an intermediate R—X capped alkylene oxide oligomer containing from about 1 to about 20 alkylene oxide units. The intermediate product R—X—$(C_mH_{2m}O)_n$—H is obtained through Reaction (1):

Reaction 1

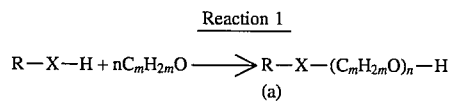

In Reaction (2), 3 moles of intermediate (a) are reacted with 1 mole of $P_2O_5$ in a prefered Reaction(2).

Reaction (2)

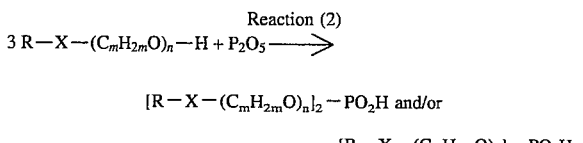

It is prefered that the reaction conditions be adjusted to favor formation of mono- and di- alkyl phosphates. This is accomplished by maintaining the reaction temperature below 110° C.

Phosphating groups that may be used in the reaction of Equation (2) include phosphorus pentoxide ($P_2O_5$) and phosphorus oxychloride ($POCl_3$). The prefered phosphating group is phosphorus pentoxide.

Since corrosion primarily occurs in the aqueous phase, many previously known inhibitors are formulated for application directly into produced water either as a dispersion or fully dissolved. The class of phosphate ester compounds described above are totally soluble or dispersible in all produced water. Therefore, these compounds may be used alone, in a solvent, or a mixture of solvents.

When using the corrosion inhibitors, it is important that the ether phosphates be introduced into a corrosive environment in an effective amount to inhibit corrosion of the metal surface of the vessel or pipe. An effective amount of ether phosphates for reducing the corrosion rate has been shown to be a concentration of from about 2 ppm to about 100 ppm. It is prefered that the ether phosphates be maintained at a concentration of about 5 ppm to about 15 ppm.

EXAMPLE 1

A phosphate ester was prepared by first reacting one molar equivalent of 2-ethylhexanol with 8 equivalents of ethylene oxide. Three equivalents of the resulting liquid ethoxylated ester were further reacted by slowly adding one equivalent of phosphorus pentoxide ($P_2O_5$) with very efficient stirring. The reaction vessel was placed in a cool water bath to prevent the exothermic reaction from increasing the reaction temperature above 110° C. and causing discoloration. By the time all the phosphorus pentoxide had been added to the vessel, the reaction was 80–90% complete. The vessel was stirred for an additional four hours at a temperature up to 110° C. until all the phosphorus pentoxide had been dissolved. The product was a solution of phosphate esters made up of mostly mono- and diesters. The color of the solution was mostly clear, but took on an amber color with heating.

EXAMPLE 2

A phosphate ester was prepared according to the procedure in Example 1 using heptanol instead of 2-ethylhexanol.

EXAMPLE 3

A phosphate ester was prepared according to the procedure in Example 1 using octanol instead of 2-ethylhexanol and only 8 equivalents of ethylene oxide.

EXAMPLE 4

A phosphate ester was prepared according to the procedure in Example 1 using decanoic acid instead of 2-ethylhexanol and only 4 equivalents of ethylene oxide.

EXAMPLE 5

A phosphate ester was prepared according to the procedure in Example 1 using dodecanol instead of 2-ethylhexanol and only 4 equivalents of ethylene oxide.

EXAMPLE 6

A phosphate ester was prepared according to the procedure in Example 1 using tetradecanol instead of 2-ethylhexanol and only 8 equivalents of ethylene oxide.

EXAMPLE 7

A phosphate ester was prepared according to the procedure in Example 1 using hexadecanoic acid instead of 2-ethylhexanol and only 8 equivalents of ethylene oxide.

EXAMPLE 8

A phosphate ester was prepared according to the procedure in Example 1 using octadecanol instead of 2-ethylhexanol and only 8 equivalents of ethylene oxide.

EXAMPLE 9

A phosphate ester was prepared according to the procedure in Example 1 using phenol instead of 2-ethylhexanol and only 4 equivalents of ethylene oxide.

EXAMPLE 10

A phosphate ester was prepared according to the procedure in Example 1 using alkylphenol instead of 2-ethylhexanol and only 9 equivalents of ethylene oxide.

EXAMPLE 11

A phosphate ester was prepared according to the procedure in Example 1 using alkyldiphenol instead of 2-ethylhexanol and only 8 equivalents of ethylene oxide.

EXAMPLE 12

A phosphate ester was prepared according to the procedure in Example 1 using a mixture of heptanol, octanol, decanoic acid, dodecanol, tetradeconal, hexadecanoic acid, octadecanol, phenol, aklylphenol, and alkyldiphenol instead of 2-ethylhexanol and only 4 equivalents of ethylene oxide.

EXAMPLE 13

To determine the effectiveness of the phosphate esters of the present invention, a set of corrosion tests were conducted. AISI1018 mild steel coupons with dimensions of 3"×0.5"×0.005"were cleaned in xylene, rinsed in isopropyl alcohol, dried, and weighed. The steel coupons were then placed in 50 individual 200 ml glass long-necked bottles.

A "sweet test" was performed by purging 25 bottles with only carbon dioxide. A "sour test" involved purging 25 bottles with carbon dioxide and hydrogen sulfide. During the purge, each bottle in both tests recieved 60 ml of synthetic 10% NaCl brine and 60 ml of deodorized kerosene. Each of the inhibitors of Examples 1 through 12 were added to two bottles in each test—one having 5 ppm inhibitor and the other having 15 ppm inhibitor. One bottle in each test received no inhibitor and served as a blank. The bottles were then filled with carbon dioxide and immediately capped to prevent the intrusion of air.

The bottles were rotated in a wheel cabinet at 180° F. for 24 hours before removing, cleaning rinsing, drying, and reweighing the coupons. The percent protection may be determined by weight loss according to the following formula:

Percent Protection=(W1−W2)/W1×100 where;

W1=Weight loss of blank coupon in milligrams

W2=Weight loss of inhibited coupon in milligrams

The corrosion rate experienced by the coupons in mils per year (thousandths of an inch) was calculated according to the following formula:

$$\text{Corrosion Rate (mpy)} = \frac{(W \times 534)}{D \times A \times T}$$

where;

W=Weight loss of coupon in milligrams (mg)

D=Density of the steel coupons in grams per cubic centimeter (g/cm³)

A=Area of coupon in square inches (in²)

T=Time of exposure in hours (hr)

The results from the "sweet" and "sour" corrosion tests of Example 13 are given in Tables 1 and 2, below.

TABLE 1

Results of the CO₂ ("Sweet") Corrosion Test

| INHIBITOR | CONCENTRATION (ppm) | CORROSION RATE (mils per year) |
|---|---|---|
| Blank | 0 | 44.3 |
| Example 1 | 5 | 2.26 |
|  | 15 | 1.6 |
| Example 2 | 5 | 3.94 |
|  | 15 | 3.2 |
| Example 3 | 5 | 3.1 |
|  | 15 | 2.2 |
| Example 4 | 5 | 3.08 |
|  | 15 | 1.94 |
| Example 5 | 5 | 1.29 |
|  | 15 | 0.86 |
| Example 6 | 5 | 1.48 |
|  | 15 | 0.63 |
| Example 7 | 5 | 2.1 |
|  | 15 | 1.8 |
| Example 8 | 5 | 4.2 |
|  | 15 | 1.24 |
| Example 9 | 5 | 14.5 |
|  | 15 | 14.8 |
| Example 10 | 5 | 2.56 |
|  | 15 | 1.7 |
| Example 11 | 5 | 2.47 |
|  | 15 | 2.7 |
| Example 12 | 5 | 3.72 |
|  | 15 | 2.97 |

TABLE 2

Results of the H₂S and CO₂ ("Sour") Corrosion Test

| INHIBITOR | CONCENTRATION (ppm) | CORROSION RATE (mils per year) |
|---|---|---|
| Blank | 0 | 44.75 |
| Example 1 | 5 | 4.0 |
|  | 15 | 3.36 |
| Example 2 | 5 | 2.88 |
|  | 15 | 2.54 |
| Example 3 | 5 | 3.45 |
|  | 15 | 2.25 |
| Example 4 | 5 | 3.17 |
|  | 15 | 1.58 |
| Example 5 | 5 | 1.77 |
|  | 15 | 2.02 |
| Example 6 | 5 | 2.78 |
|  | 15 | 2.2 |
| Example 7 | 5 | 3.26 |
|  | 15 | 1.92 |
| Example 8 | 5 | 3.02 |
|  | 15 | 2.75 |
| Example 9 | 5 | 2.49 |
|  | 15 | 2.73 |
| Example 10 | 5 | 2.16 |
|  | 15 | 1.73 |
| Example 11 | 5 | 2.69 |
|  | 15 | 2.16 |
| Example 12 | 5 | 2.88 |
|  | 15 | 2.29 |

While the foregoing is directed to the preferred embodiment of the present invention, other and further embodiments of the invention may be devised without departing from the basic scope thereof which is determined by the claims that follow.

What is claimed is:

1. A method of inhibiting corrosion of metal process equipment in an oil field corrosive environment comprising the step of introducing a corrosion inhibiting effective amount of a mixture consisting essentially of ether phosphates defined by the formula:

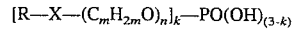

$[R-X-(C_mH_{2m}O)_n]_k-PO(OH)_{(3-k)}$ where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), and a secondary amine group (—NH—);

m is from 2 to 4;

n is between about 1 and about 20; and k is from 1 to 2.

2. The method of claim 1 further comprising the step of maintaining an effective concentration of the inhibitor for substantially preventing corrosion of metals.

3. The method of claim 2 wherein the metal is a ferrous metal.

4. The method of claim 1 wherein about 2 ppm to about 100 ppm ether phosphates are introduced into the corrosive environment.

5. The method of claim 4 wherein about 5 ppm to about 15 ppm ether phosphates are introduced into the corrosive environment.

6. A method of inhibiting corrosion of metal process equipment in an oil field corrosive environment comprising the step of introducing a corrosion inhibiting effective amount of a mixture consisting essentially of ether phosphates defined by the formula:

$$(R-X-(C_mH_{2m}O)_n)_k-PO(OH)_{(3-k)}$$

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), and a secondary amine group (—NH—);

m is from 3 to 4;

n is between about 1 and about 20; and k is from 1 to 2.

7. A method of inhibiting corrosion of metal process equipment in an oil field corrosive environment comprising the step of introducing a corrosion inhibiting effective amount of a mixture consisting essentially of ether phosphates defined by the formula:

$$(R-X-(C_mH_{2m}O)_n)_2-PO(OH)$$

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), and a secondary amine group (—NH—);

m is from 2 to 4; and n is between about 1 and about 20.

8. The method of claim 1 where n is about 8.
9. The method of claim 6 where n is about 8.
10. The method of claim 7 where n is about 8.
11. The method of claim 1 where n is up to about 12.
12. The method of claim 6 where n is up to about 12.
13. The method of claim 7 where n is up to about 12.

* * * * *